P. L. STREIT.
COMBINATION HANDLE AND CRANK.
APPLICATION FILED AUG. 20, 1920.
1,423,469.
Patented July 18, 1922.
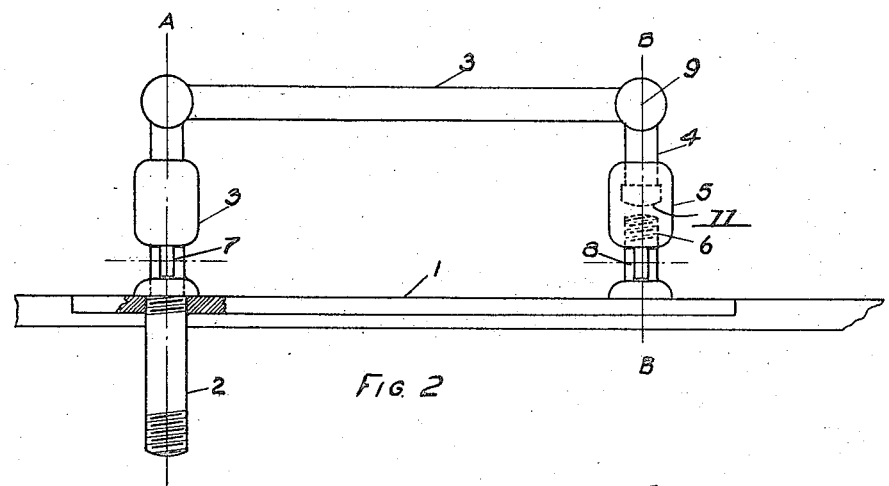
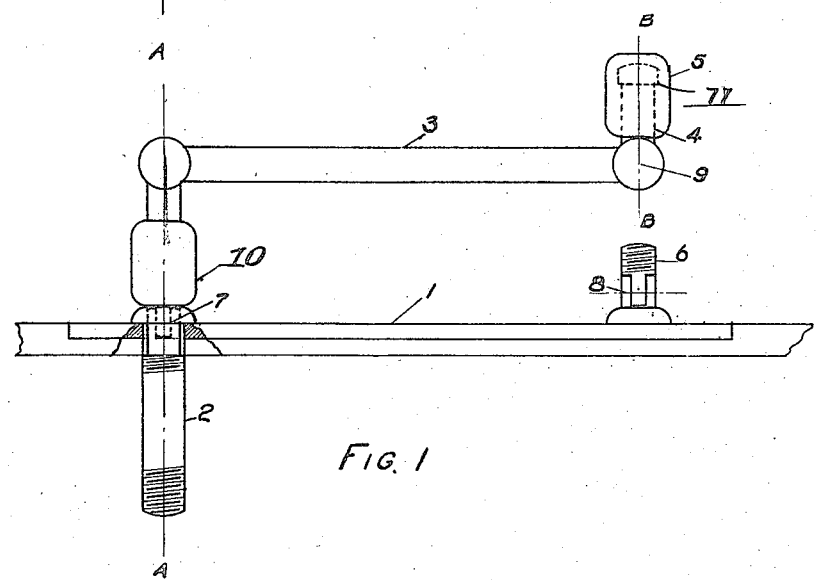

UNITED STATES PATENT OFFICE.

PETER LOUIS STREIT, OF GRAND VIEW, NEW YORK.

COMBINATION HANDLE AND CRANK.

1,423,469.  Specification of Letters Patent.  Patented July 18, 1922.

Application filed August 20, 1920. Serial No. 404,326.

*To all whom it may concern:*

Be it known that I, PETER LOUIS STREIT, a citizen of the United States, residing at Grand View, in the county of Rockland, State of New York, have invented a new and useful Combination Handle and Crank, of which the following is a specification.

This invention relates to combination handles and cranks.

The object of this invention is to provide a crank that may be converted into a handle for carrying or other purposes.

This object is accomplished by providing a crank that may be attached to any shaft and having a hinged handpiece that may be rotated through an angle of 180° from its position, extending outward at right angles to the crank arm, to engage with a stud mounted on the casing enclosing the shaft to which the crank is connected.

This and other objects of the invention will be more clearly understood from the following detailed description and accompanying drawings.

Figure 1 is a side elevation of the combination handle and crank showing it attached to a shaft as a crank;

Figure 2 is a side elevation showing the combination handle and crank mounted as a handle.

Referring to the above-mentioned drawings, a shaft 2 projects beyond the wall of the casing 1. The outer end of this shaft is provided with a slotted portion in which a threaded stud 7 is hinged. A crank arm 3 is connected to the threaded stud 7 by means of a coupling 10. Hinged to the other end of the crank arm 3 at 9 is a bolt 4 which has an enlarged end 11. A coupling having an internal thread in one end is slidably mounted on the bolt 4, and is held in contact with the bolt by means of the head 11. Mounted in alinement with the rod 4 is a stud 8 having its upper end threaded as shown at 6.

In order to use the device as a crank the hand-piece, which consists of a coupling 5 mounted on the bolt 4, is rotated to a position at right angles to the lever arm 3 and extending outward from the casing 1. In this position we have a lever with a rotatable hand-piece. When it is desired to use the device as a handle the hand-piece is rotated through an angle of 180° bringing it at right angles to the lever arm 3 but extending inward. The coupling 5 is now in alinement with stud 8 and it is rotated, engaging the internal thread of the coupling with the threaded end 6 of the stud. Both ends of the lever arm are now connected to the casing and we have a handle that may be used for various purposes. It is also possible to have a hinged stud 8 which, in conjunction with the threaded stud 7 that may also be hinged, would give a handle that might be rotated inward to lie on the casing 1.

I would state in conclusion that while the illustrated example constitutes a practical embodiment of my invention I do not limit myself strictly to the exact details herein illustrated since manifestly the same can be considerably varied without departing from the spirit of the invention as defined in the appended claims.

Claims.

1. A combination crank and handle comprising a crank arm, means fixed to one end of the crank arm for attaching it to a shaft to operate the latter, a hand-piece hinged to the other end of the crank arm, and means for connecting it to a casing to form a handle for carrying purposes.

2. A combination crank and handle for a portable machine including a shaft and enclosed in a casing, comprising an arm, means fixed to one end of the arm for connecting it to the shaft, a hand-piece pivotally mounted on the other end of the arm, and means for connecting the hand-piece to the casing to form a handle for carrying the machine.

3. A combination crank and handle comprising a crank arm, means fixed to one end of the crank arm for connecting it to a shaft, a bolt hinged to the other end of the crank arm, a hollow hand-piece internally threaded in engagement with the threaded bolt, and a threaded stud that may be mounted on a machine or casing with which the hand-piece makes threaded engagement to make a handle out of the crank arm.

4. As a new article of manufacture, a combination crank and handle comprising a crank arm, means for detachably connecting one end of the crank arm to a shaft, a bolt member hinged to the other end of the crank arm, a hollow hand-piece having an internal thread at one end and mounted on the bolt, and a threaded stud fixed to the casing with which the hand-piece may make threaded engagement to convert the crank into a handle.

5. As a new article of manufacture, a combination crank and handle comprising a crank arm, means for detachably connecting one end of the crank arm to a shaft, a bolt hinged to the other end of the crank arm, a hand-piece, means for attaching the hand-piece to the bolt member, a stud mounted on the casing enclosing the shaft, and means for detachably connecting the hand-piece to stud to convert the crank arm into a handle.

PETER LOUIS STREIT.